United States Patent
Ohgake (10) Patent No.: US 7,006,416 B1
(45) Date of Patent: Feb. 28, 2006

(54) RECORD MEDIUM WITH MECHANISM OF SECRECY PROTECTION

(75) Inventor: Mitsuru Ohgake, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 1022 days.

(21) Appl. No.: 09/637,795

(22) Filed: Aug. 11, 2000

(30) Foreign Application Priority Data

Oct. 6, 1999 (JP) .................................. 11-285244

(51) Int. Cl.
G11B 5/09 (2006.01)
(52) U.S. Cl. ............... 369/53.2; 369/47.22; 369/53.21; 369/59.25; 369/30.03
(58) Field of Classification Search ............... 369/53.2, 369/53.21, 53.16, 53.31, 47.21, 47.22, 59.25, 369/275.3, 30.03, 30.04; 386/95, 96, 97, 386/126
See application file for complete search history.

(56) References Cited

U.S. PATENT DOCUMENTS

| | | | | |
|---|---|---|---|---|
| 5,270,877 A | * | 12/1993 | Fukushima et al. ............ 360/48 |
| 5,648,954 A | * | 7/1997 | Satoh ........................ 369/53.17 |
| 5,737,639 A | * | 4/1998 | Ohmori .................... 369/275.3 |
| 5,778,142 A | * | 7/1998 | Taira et al. .................... 386/97 |
| 5,902,115 A | * | 5/1999 | Katayama ............... 434/307 A |
| 6,072,759 A | * | 6/2000 | Maeda et al. ............ 369/59.25 |
| 6,374,037 B1 | * | 4/2002 | Okada et al. .................. 386/95 |
| 6,519,676 B1 | * | 2/2003 | Suzuki et al. ............ 369/30.25 |
| 6,680,890 B1 | * | 1/2004 | Suzuki et al. ............ 369/53.24 |

FOREIGN PATENT DOCUMENTS

| | | |
|---|---|---|
| EP | 0 737 974 A2 | 10/1996 |
| EP | 0 806 868 A2 | 11/1997 |
| EP | 1 006 526 A1 | 6/2000 |
| JP | 63259866 | 10/1988 |
| JP | 03057037 A * | 3/1991 |

* cited by examiner

Primary Examiner—Thang V. Tran
(74) Attorney, Agent, or Firm—Dickstein Shapiro Morin & Oshinsky LLP (57) ABSTRACT

A record medium preventing a first drive device from reading data therefrom while allowing a second drive device to read the data therefrom wherein data-read operation is performed according to volume management information stored in the record medium, including a predetermined area which stores record-medium-identification information therein, and a volume management information area which is different from the first predetermined area, and stores the volume management information therein.

16 Claims, 12 Drawing Sheets

RECORD MEDIUM WITH MECHANISM OF SECRECY PROTECTION

BACKGROUND OF THE INVENTION

1. Field of the Invention

The present invention generally relates to a record medium, and particularly relates to a record medium that can keep secret information recorded therein and to a record medium that stores therein a data read/write program.

2. Description of the Related Art

An optical disk is commonly used as a record medium for use with a personal computer because of its large storage capacity and portability. A system called ISO9660 is generally used as a file system in the optical disk.

Figure 1:
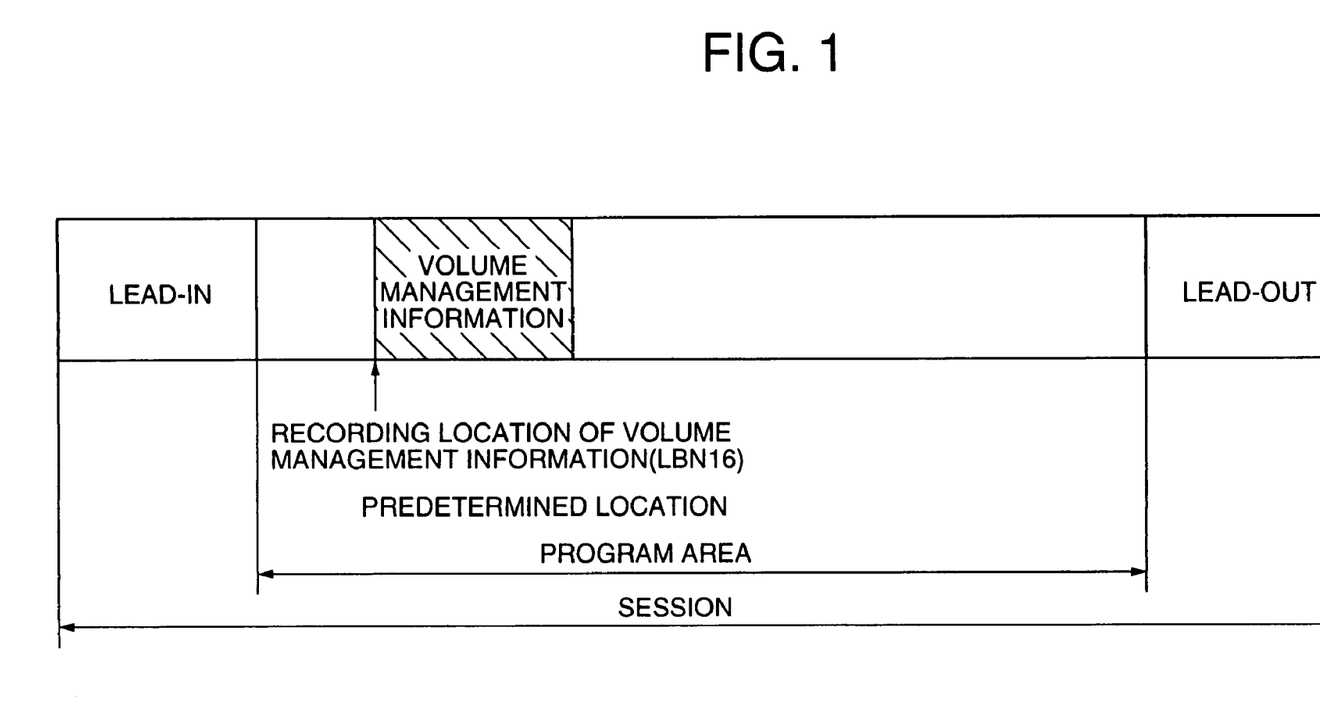
FIG. 1 is a diagram for the purpose of describing a record format of a conventional record medium.

FIG. 1 is a diagram for the purpose of describing an ISO9669 file system. A session of the file system includes three domains, which are a lead-in, a program area and a lead-out. The program area is comprised of logical blocks, and volume management information is recorded in the location of a logical block number (LBN) 16. By reading the recorded volume management information from LBN 16, a recorded file is retrieved or a new file is stored.

However, the ISO9660 file system is not provided with any measure for secrecy protection to protect the stored data, and the data can be read out freely.

SUMMARY OF THE INVENTION

Accordingly, it is a general object of the present invention to provide a record medium that can protect secret information recorded therein, thereby eliminating the disadvantages described above.

The above-described object of the present invention is achieved by a record medium preventing a first drive device from reading data therefrom while allowing a second drive device to read the data therefrom wherein data-read operation is performed according to volume management information stored in the record medium, including:

- a predetermined area which stores record-medium-identification information therein, the predetermined area being known by the first drive device as an area for storing the volume management information; and
- a volume management information area which is different from the predetermined area, and stores the volume management information therein, the volume management information area being accessed by the second drive device to obtain the volume management information.

Other objects, features and advantages of the present invention will become more apparent from the following detailed description when read in conjunction with the accompanying drawings.

DESCRIPTION OF THE PREFERRED EMBODIMENTS

A description will now be given of preferred embodiments of the present invention, with reference to the accompanying drawings.

Figure 2:
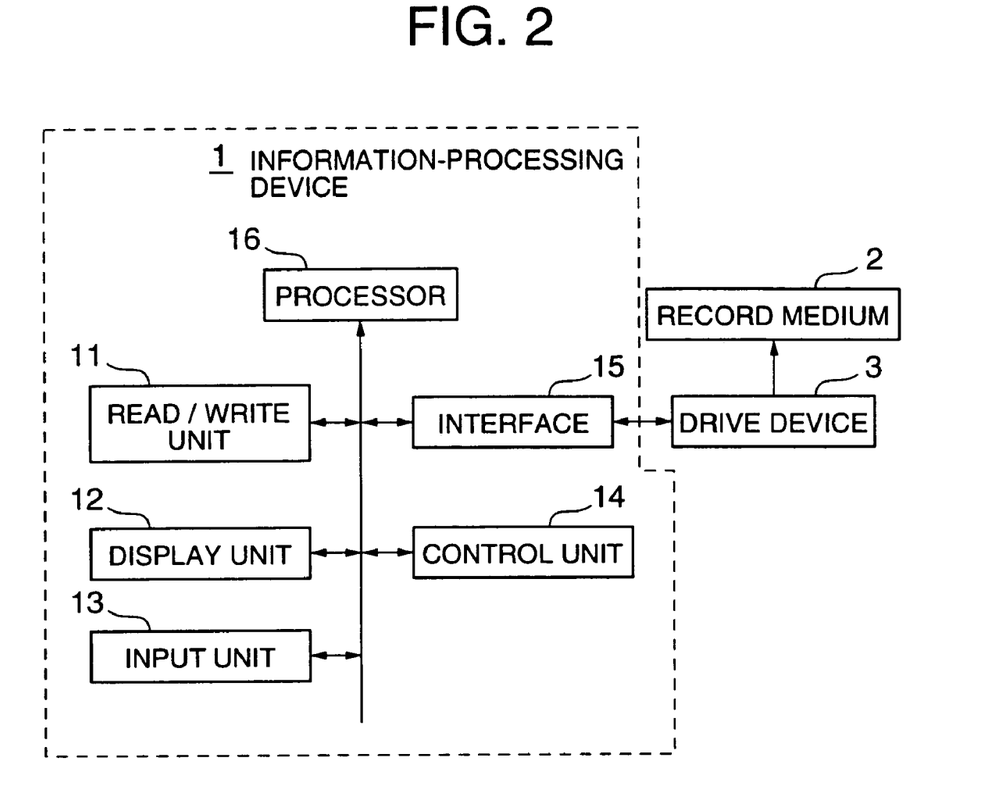
FIG. 2 is a block diagram showing an example of a system according to the present invention.

FIG. 2 is a block diagram showing an example of the system according to the present invention. The system includes an information-processing device 1 such as a personal computer or the like, a record medium such as an optical disk or the like that stores therein data, and a drive device 3 reading data from and writing data to the record medium 2.

The information-processing device 1 includes a read/write unit 11 storing a data read/write program of the present invention, a display unit 12, an input unit 13, a control unit 14, an interface (I/O) 15 and a processor 16 for data processing.

Figure 3:
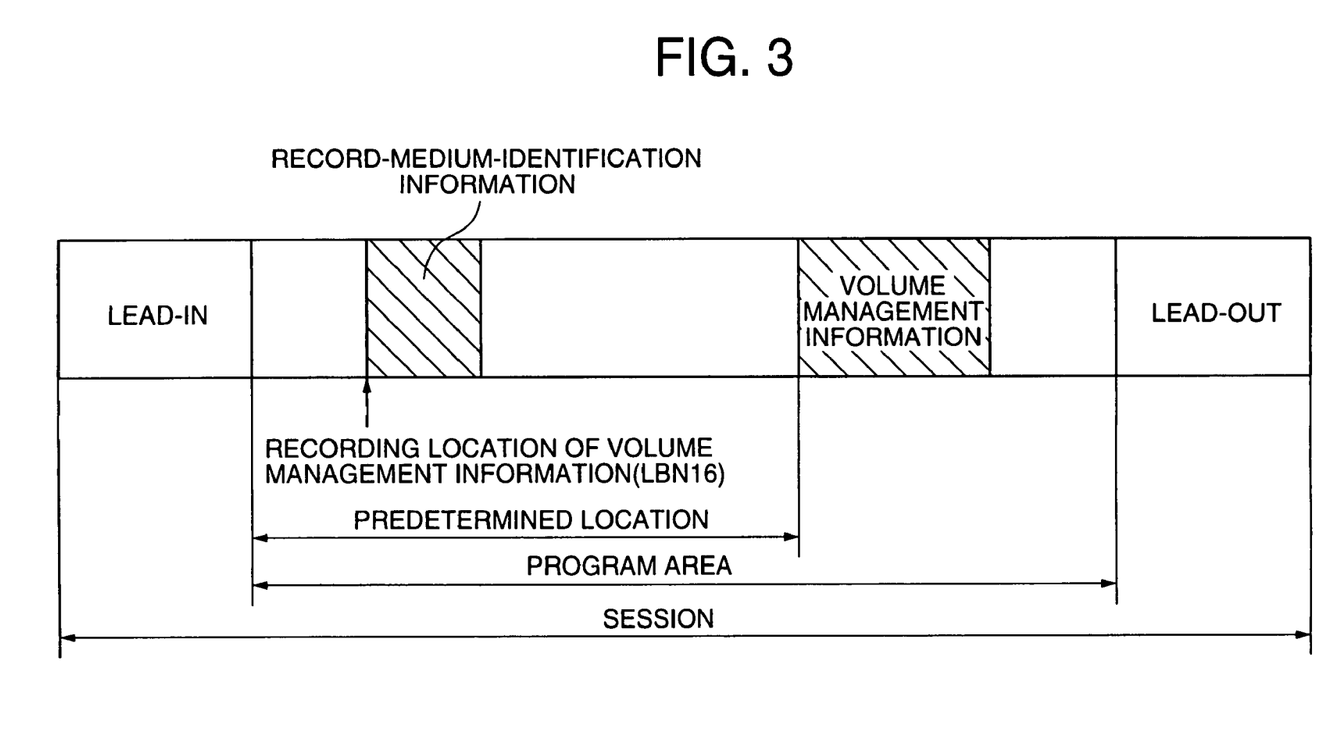
FIG. 3 is a diagram showing a record format of a record medium according to a first embodiment of the present invention.
Figure 4:
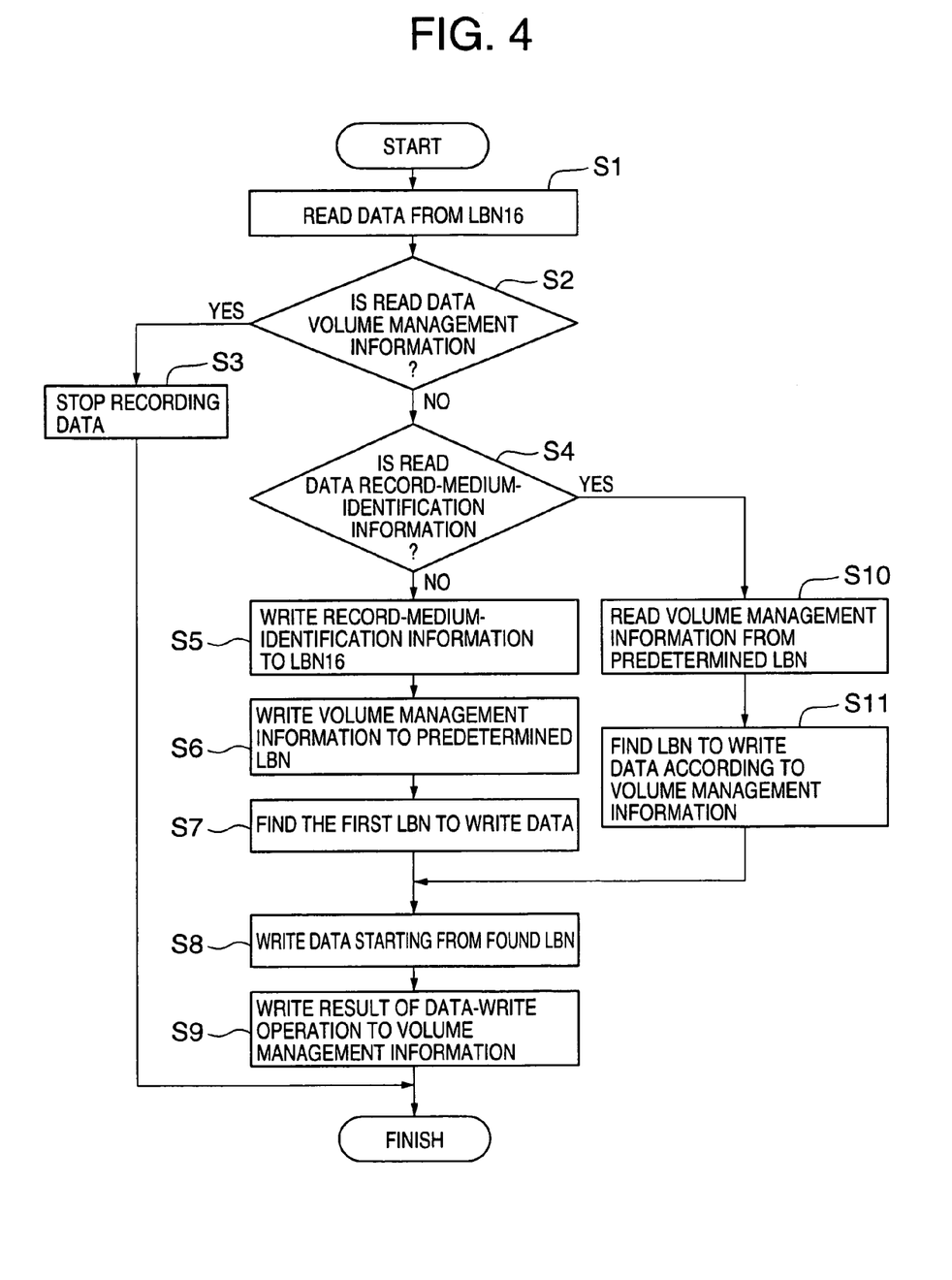
FIG. 4 is a flowchart of a process performed at the time of data-write operation in the first embodiment of the present invention.
Figure 5:
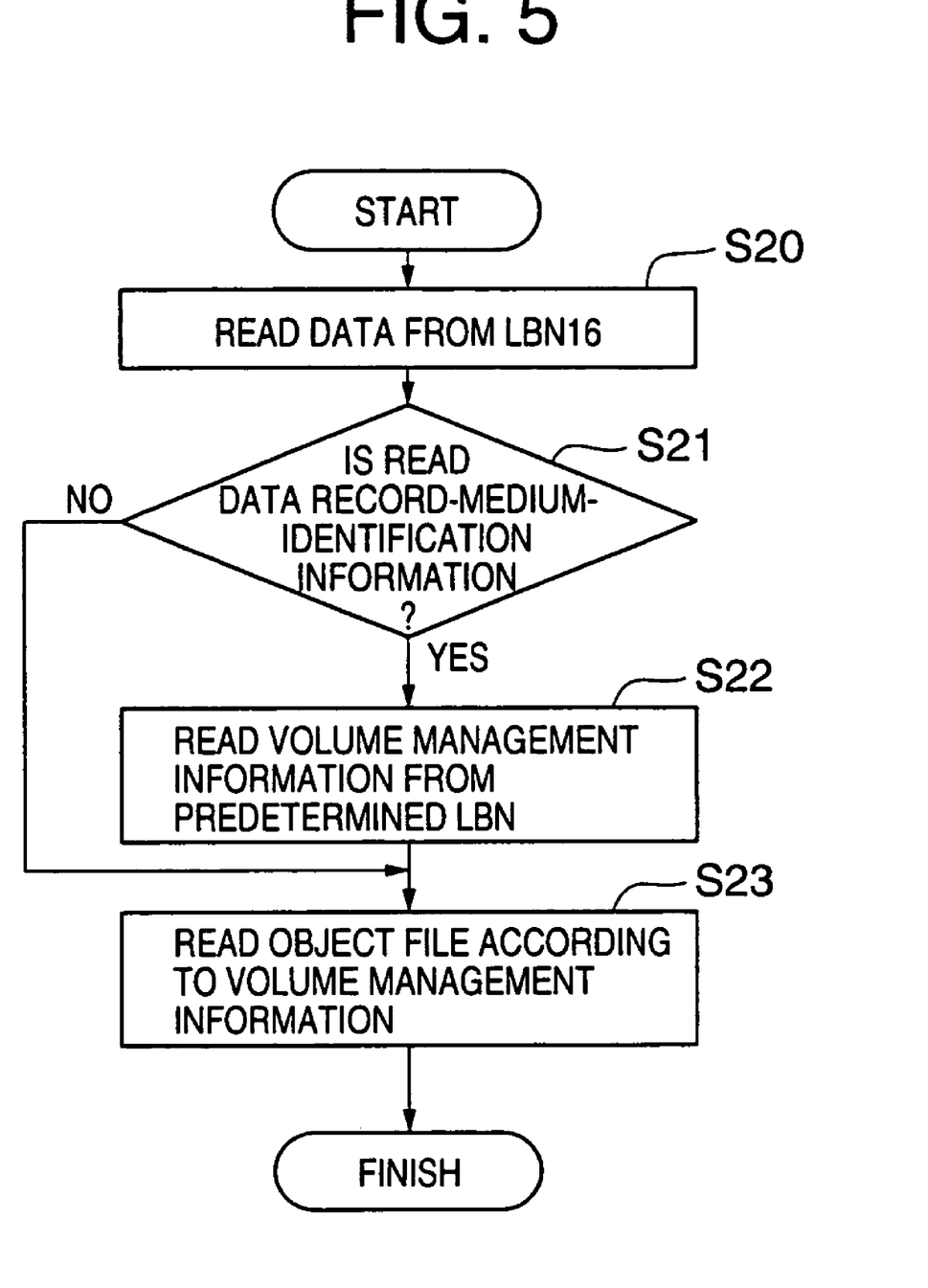
FIG. 5 is a flowchart of a process performed at the time of data-read operation in the first embodiment of the present invention.

A description will now be given of a first embodiment of the present invention, with reference to FIGS. 3, 4 and 5. FIG. 3 is a diagram showing a record format of a record medium according to the first embodiment of the present invention. FIG. 4 is a flowchart of a process performed at the time of data-write operation in the first embodiment of the present invention. FIG. 5 is a flowchart of a process performed at the time of data-read operation in the first embodiment of the present invention.

In the first embodiment of the present invention as shown in FIG. 3, record-medium-identification information is recorded in LBN 16, where volume management information defined by the ISO9660 is supposed to be recorded. The volume management information is recorded in a predetermined location different from LBN=16. The record-medium-identification information indicates that data is recorded in the record medium 2 in a different format from the record format of the ISO9660 file system. For instance, "RICOH-SECURE-DISK" is recorded in LBN 16 as the record-medium-identification information.

A description will now be given of a data-write operation in the first embodiment of the present invention, with reference to FIG. 4. When the record medium 2 is loaded to the drive device 3, and the data read/write program stored in the read/write unit 11 starts operation thereof, the data read/write program reads data from LBN=16 at a step S1.

At a step S2, the program determines whether the read data at the step S1 is the volume management information. If it is ascertained that the read data is the volume management information, the program proceeds to a step S3, at which the data-write operation is stopped. In this case, data is previously recorded according to the ISO9660 file system in the record medium 2 that is loaded to the drive device 3. Accordingly, the program stops writing data, and a new record medium 2 is loaded to the drive device 3.

If it is ascertained at the step S2 that the read data is not the volume management information, the program determines whether the read data is the record-medium-identification information at a step S4. If it is ascertained that the read data is not the record-medium-identification information, the program proceeds to a step S5. At the step S5, since the volume management information and the record-medium-identification information are not recorded in LBN=16, the program ascertains that the record medium 2 in the drive device 3 is brand new, and writes the record-medium-identification information in LBN=16.

At a step S6, the program writes the volume management information in a predetermined LBN different from LBN=16. At a step S7, the program determines the first LBN defined by the ISO9660, wherein data is written. Proceeding to a step S8, the program writes data in the record medium 2 by starting from the calculated LBN. After writing the data, the program records results of the data-write operation in the volume management information at a step S9, and terminates the write process.

If it is ascertained at the step S4 that the read data is the record-medium-identification information, the program reads the volume management information from the predetermined LBN at a step S10, and calculates an LBN from the obtained volume management information at a step S11 where the calculated LBN marks the start point from which data is successively written. Thereafter, the program proceeds to a step S8 and executes the above-described steps S8 and S9.

A description will now be given of a process performed at the time of data-read operation in the first embodiment of the present invention, with reference to FIG. 5. At a step S20, the program reads data from LBN=16 in the record medium 2. At a step S21, the program determines whether the read data is the record-medium-identification information. If it is ascertained at the step S21 that the read data is the record-medium-identification information, the program reads the volume management information from the predetermined LBN at a step S22.

The program reads the file according to the read volume management information at a step S23, and terminates the read process. If it is ascertained at the step S21 that the read data is not the record-medium-identification information, the volume management information should be present in LBN=16 as defined by the ISO9660 file system. Accordingly, the program reads the file at the step S23.

Figure 6:
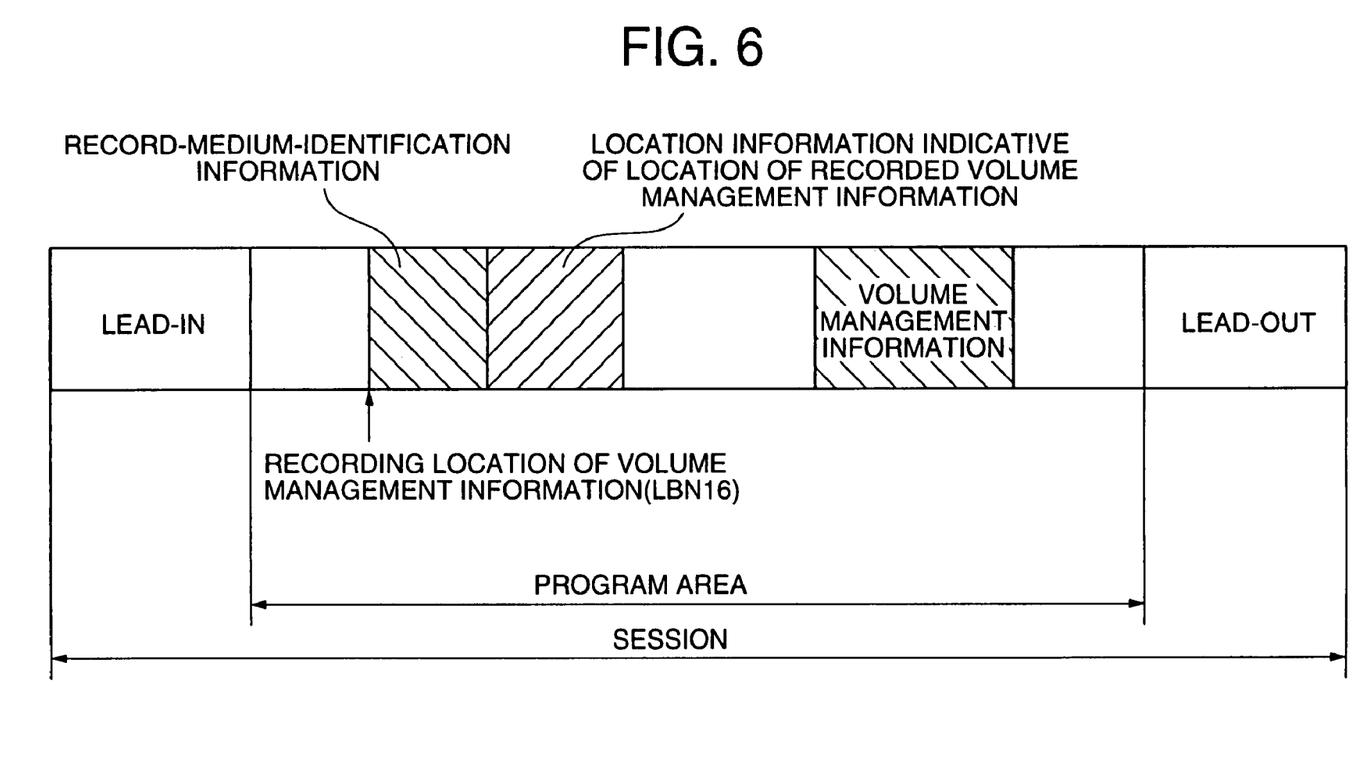
FIG. 6 is a diagram showing a record format of a record medium according to a second embodiment of the present invention.
Figure 7:
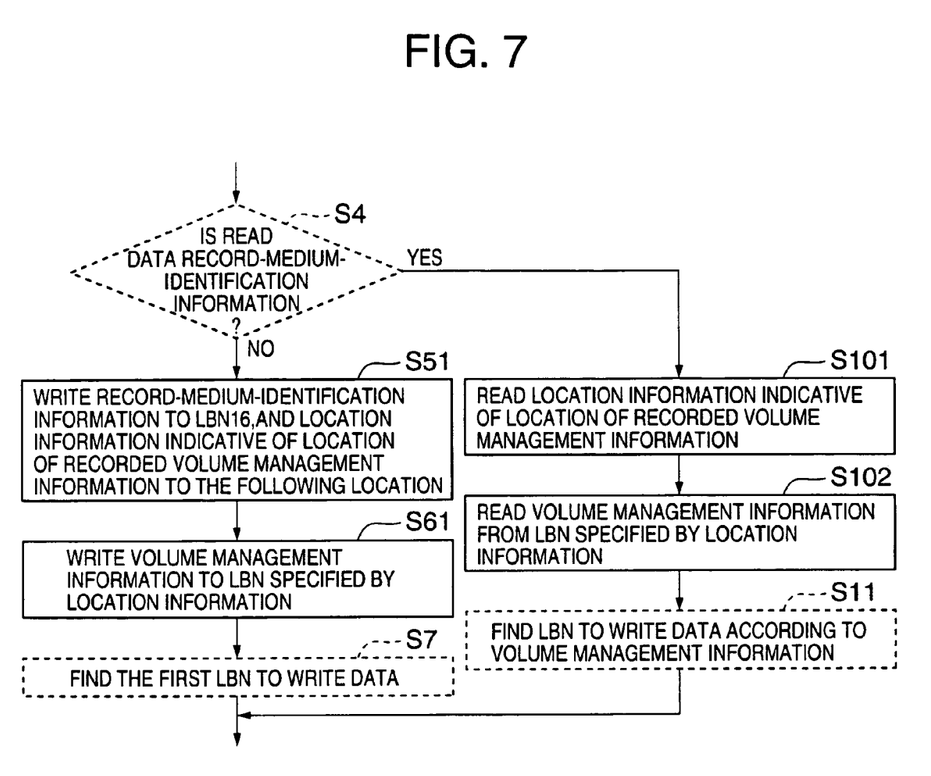
FIG. 7 is a flowchart of a process performed at the time of data-write operation in the second embodiment of the present invention.
Figure 8:
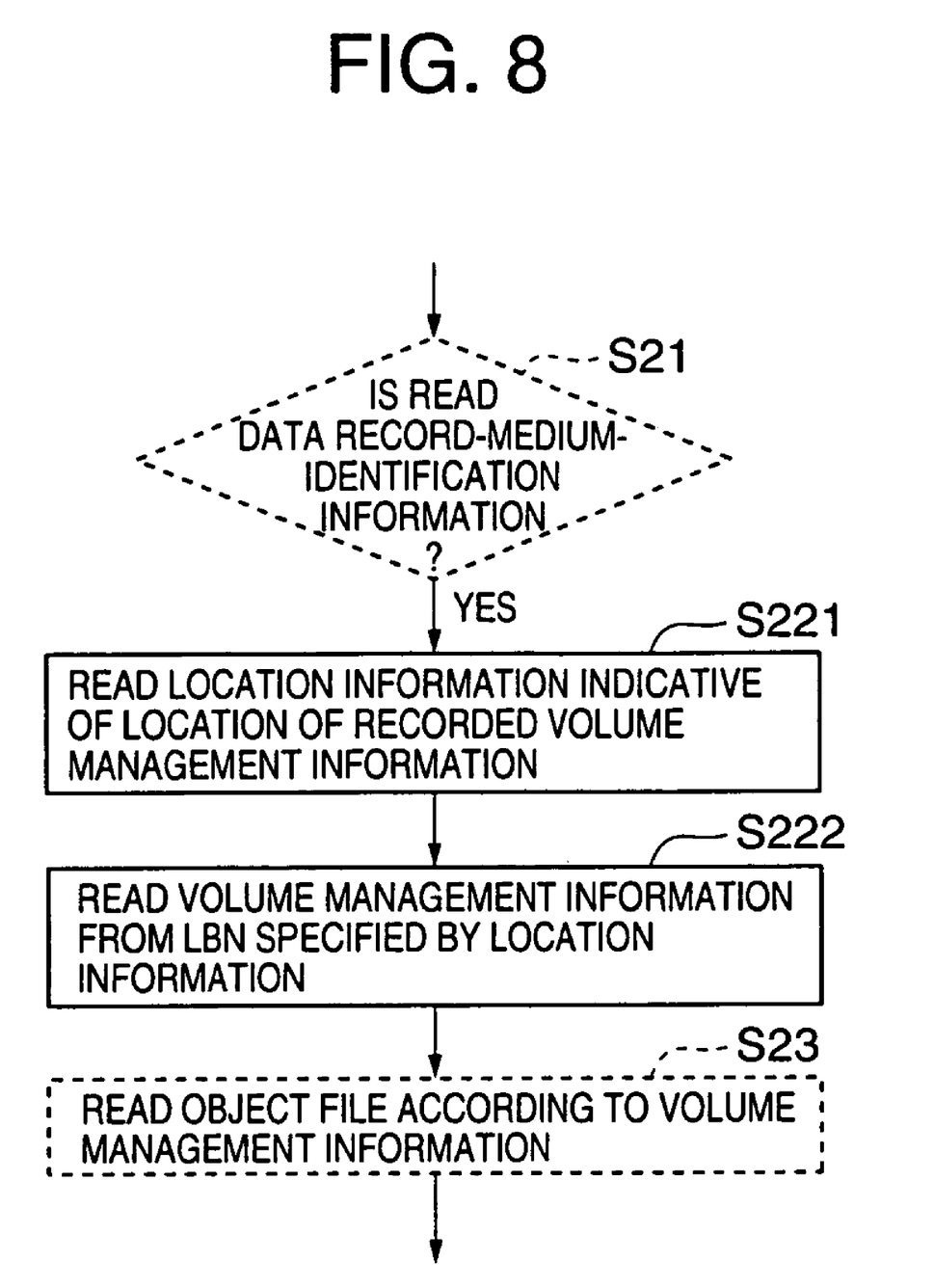
FIG. 8 is a flowchart of a process performed at the time of data-read operation in the second embodiment of the present invention.

As described above, in the present invention, the record-medium-identification information is recorded in the LBN, where the volume management information defined by the ISP9660 is supposed to be recorded, and the volume management information is recorded in the predetermined LBN different from LBN=16. Even if a regular information-processing device reads data from LBN=16 of the record medium 2, the device cannot read other data from the record medium 2 since the data recorded in LBN=16 is not the volume management information. Consequently, the present invention helps to guard the stored data in the record medium 2. A description will now be given of a second embodiment of the present invention, with reference to FIGS. 6, 7 and 8. FIG. 6 is a diagram showing a record format of a record medium according to a second embodiment of the present invention. FIG. 7 is a flowchart of a process performed at the time of data-write operation in the second embodiment of the present invention. FIG. 8 is a flowchart of a process performed at the time of data-read operation in the second embodiment of the present invention. In the second embodiment of the present invention as shown in FIG. 6, location information indicative of a location of the recorded volume management information is recorded next following the record-medium-identification information stored at LBN=16.

A process performed at the time of data-write operation in the second embodiment of the present invention is shown in FIG. 7. In the second embodiment, a step S51 and a step S61 correspond respectively to the step S5 and the step S6 of the first embodiment shown in FIG. 4. A step S101 and a step S102 correspond to the step S10 of the first embodiment.

If it is ascertained at the step S4 that the read data is not the record-medium-identification information, the program interprets the record medium 2 as a brand new record medium and proceeds to the step S51. At the step S51, the program writes the record-medium-identification information in LBN=16 and writes the location information in the following location. At the following step S61, the program writes the volume management information in the LBN specified by the recorded location information, and proceeds to the step S7.

If it is ascertained at the step S4 that the read data is the record-medium-identification information, the program proceeds to the step S101 and reads the recorded location information indicative of a location of the recorded volume management information. At the following step S102, the program reads the volume management information from the LBN specified by the obtained location information, and proceeds to the step S11.

A process performed at the time of data-read operation in the second embodiment of the present invention is shown in FIG. 8. In the second embodiment, a step S221 and a step S222 correspond to the step S22 of the first embodiment shown in FIG. 5.

If it is ascertained at the step S21 that the read data is the record-medium-identification information, the program proceeds to the step S221 and reads the following recorded location information indicative of a location of the recorded volume management information. At the following step S222, the program reads the volume management information from the LBN specified by the obtained location information, and proceeds to the step S23.

Figure 9:
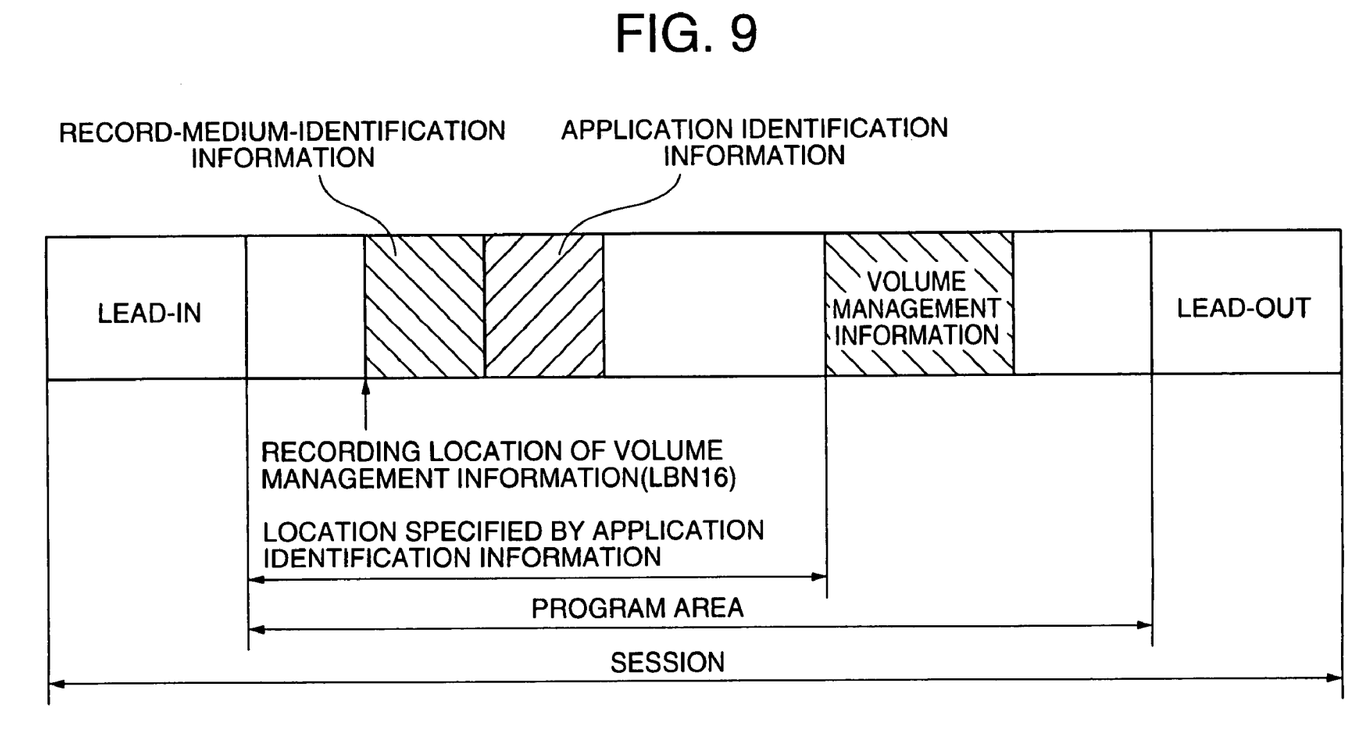
FIG. 9 is a diagram showing a record format of a record medium according to a third embodiment of the present invention.
Figure 10:
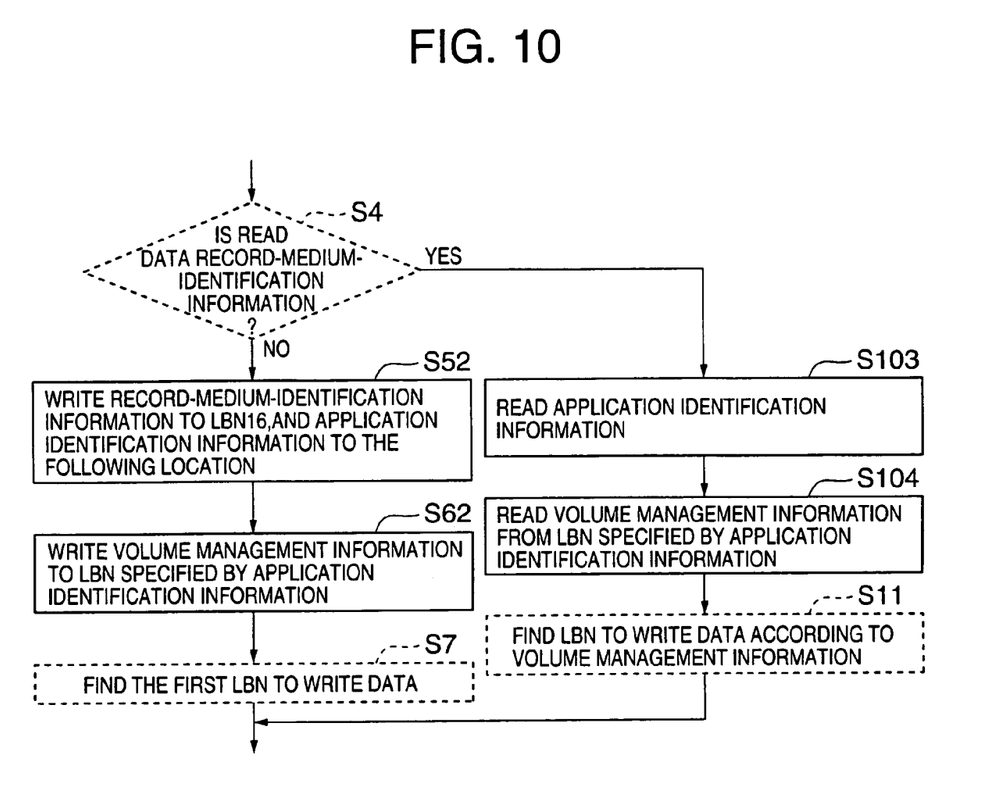
FIG. 10 is a flowchart of a process performed at the time of data-write operation in the third embodiment of the present invention.
Figure 11:
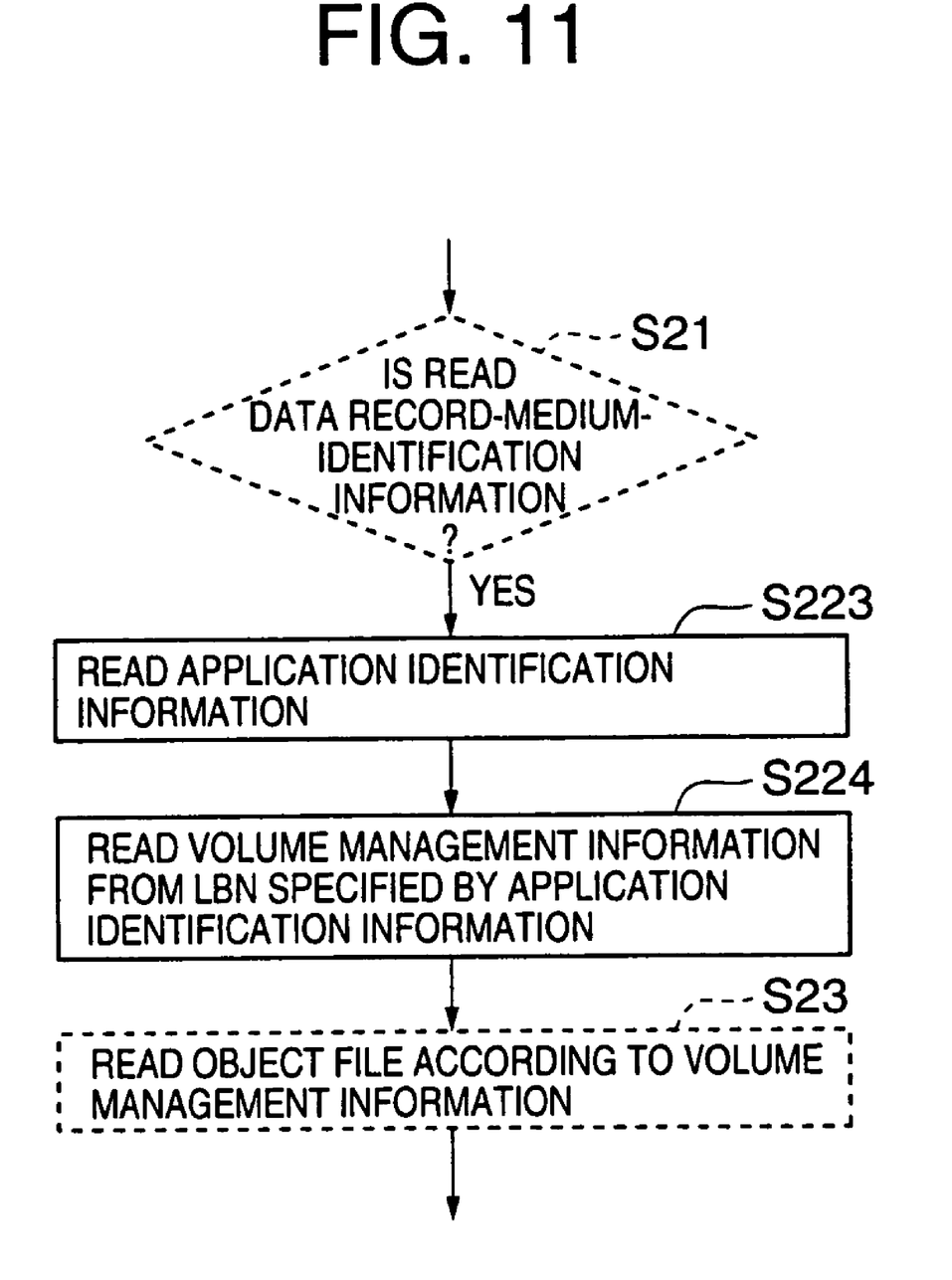
FIG. 11 is a flowchart of a process performed at the time of data-read operation in the third embodiment of the present invention.

A description will now be given of a third embodiment of the present invention, with reference to FIGS. 9, 10 and 11. FIG. 9 is a diagram showing a record format of a record medium according to a third embodiment of the present invention. FIG. 10 is a flowchart of a process performed at the time of data-write operation in the third embodiment of the present invention. FIG. 11 is a flowchart of a process performed at the time of data-read operation in the third embodiment of the present invention.

In the first and the second embodiments of the present invention, a single program name is given for the data read/write program stored in the read/write unit 11 of the information-processing device 1. However in the third embodiment of the present invention, a program name is given for each user, and the program names are recorded as application identification information next to the record-medium-identification information that is stored at LBN=16 as shown in FIG. 9.

Additionally, the LBN that has the volume management information stored therein is recorded at a location specified by the predetermined application identification information. A process performed at the time of data-write operation in the third embodiment of the present invention is shown in FIG. 10. In the third embodiment, a step S52 and a step S62 correspond respectively to the step S5 and the step S6 of the first embodiment shown in FIG. 4. A step S103 and a step S104 correspond to the step S10 of the first embodiment.

If it is ascertained at the step S4 that the read data is not the record-medium-identification information, the program interprets the record medium 2 as a brand new record medium and proceeds to the step S52. At the step S52, the program writes the record-medium-identification information in LBN=16 and writes the application identification information to the following location. At the following step S62, the program writes the volume management information in the LBN specified by the recorded application identification information, and proceeds to the step S7.

If it is ascertained at the step S4 that the read data is the record-medium-identification information, the program proceeds to the step S103 and reads the recorded application identification information. At the following step S104, the program reads the volume management information from the LBN specified by the read application identification information, and proceeds to the step S11.

A process performed at the time of data-read operation in the third embodiment of the present invention is shown in FIG. 11. In the third embodiment, a step S223 and a step S224 correspond to the step S22 of the first embodiment shown in FIG. 5.

If it is ascertained at the step S21 that the read data is the record-medium-identification information, the program proceeds to the step S223 and reads the following recorded application identification information. At the following step S224, the program reads the volume management information from the LBN specified by the read application identification information, and proceeds to the step S23.

Figure 12:
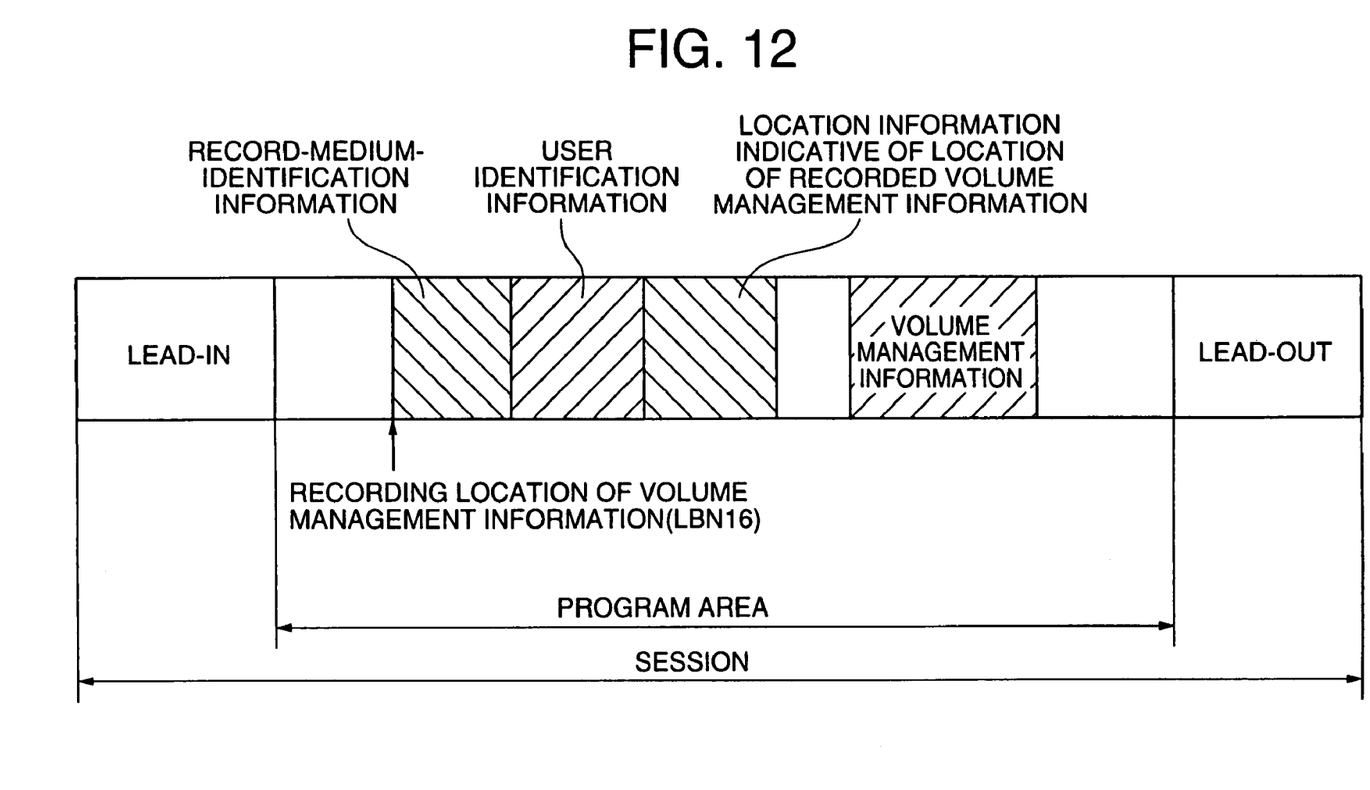
FIG. 12 is a diagram showing a record format of a record medium according to a fourth embodiment of the present invention.

A description will now be given of a fourth embodiment of the present invention, with reference to FIG. 12. In the fourth embodiment of the present invention, user identification information is recorded next to the record-medium-identification information stored at LBN=16 as shown in FIG. 12. The program reads the record-medium-identification information and the following user identification information at the time of data read/write operation. If user identification information that is given by a user does not correspond to the user identification information recorded in the record medium 2, the program stops and does not execute further processes.

In a case that the record medium 2 is comprised of multi sessions, the present invention may be applied only in the last session of the sessions in the record medium 2. In other words, the record-medium-identification information is obtained from the location where the volume management information defined by the ISO9660 is supposed to be recorded in the last session, since the ISO9660 file system initially accesses the last session of the record medium 2 and reads the volume management information therefrom.

The above description is provided in order to enable any person skilled in the art to make and use the invention and sets forth the best mode contemplated by the inventors of carrying out the invention.

The present invention is not limited to the specifically disclosed embodiments and variations, and modifications may be made without departing from the scope and spirit of the invention.

The present application is based on Japanese Priority Application No. 11-285244, filed on Oct. 6, 1999 with the Japanese Patent Office, the entire contents of which are hereby incorporated by reference.

What is claimed is:

1. A record medium preventing a first drive device from reading data therefrom while allowing a second drive device to read the data therefrom wherein data-read operation is performed according to volume management information stored in said record medium, comprising:

a predetermined area which stores record-medium-identification information therein, said predetermined area being known by the first drive device as an area for storing said volume management information; and a volume management information area which is different from said predetermined area, and stores said volume management information therein, said volume management information area being accessed by the second drive device to obtain said volume management information.

2. The record medium as claimed in claim 1, wherein location information indicative of a location of said volume management information area is recorded in a location following said predetermined area.

3. The record medium as claimed in claim 1, wherein application identification information is recorded in a location following said predetermined area, said application identification information being used for specifying said volume management information area.

4. The record medium as claimed in claim 1, wherein user identification information is recorded in a location following said predetermined area, said user identification information being used for verifying a permitted user by comparing with user identification information given by said user.

5. The record medium as claimed in claim 1, wherein said predetermined area is located in a last session of said record medium.

6. A record medium having data read therefrom or written therein according to volume management information stored therein, said record medium comprising:

a predetermined area which is designated by a predetermined file system as an area for storing the volume management information, but stores record-medium-identification information therein instead of said volume management information, and wherein said record-medium-identification information stored in said predetermined area of said record medium indicates that data is recorded in the record medium in a different format than that of said predetermined file system; and a volume management information area that is different from said predetermined area storing said record-medium-identification information therein, which stores said volume management information therein.

7. The record medium as claimed in claim 6, wherein location information indicative of a location of said volume management information area is recorded in a location following said predetermined area.

8. The record medium as claimed in claim 6, wherein application identification information is recorded in a location following said predetermined area, said application identification information being used for specifying said volume management information area.

9. A record medium having data read therefrom or written therein according to volume management information stored therein, said record medium comprising:
- a predetermined area which stores record-medium-identification information therein instead of said volume management information; and
- a volume management information area that is different from said predetermined area storing said record-medium-identification information therein, which stores said volume management information therein; and
- wherein user identification information is recorded in a location following said predetermined area, said user identification information being used for verifying a permitted user by comparing with user identification information given by said user.

10. The record medium as claimed in claim 6, wherein said predetermined area is located in a last session of said record medium.

11. A record medium readable by a machine, said record medium comprising:
- a predetermined area where volume management information is supposed to be recorded; and
- wherein said record medium tangibly embodies a program of instructions executable by the machine to perform method steps for reading data therefrom or writing data therein, said method steps comprising:
- reading data from said predetermined area of said record medium;
- determining whether the read data is identical to record-medium-identification information; and
- reading said volume management information from a volume management information area different from said predetermined area if it is ascertained that said read data is said record-medium-identification information.

12. The record medium as claimed in claim 11, said method steps comprising:
- reading location information indicative of a location of said volume management information area from a location following said predetermined area; and
- reading said volume management information from said volume management information area specified by said location information indicative of a location of said volume management information area.

13. The record medium as claimed in claim 11, wherein said record medium includes a location following said predetermined area; and wherein said method steps comprise:
- reading application identification information from a location following said predetermined area; and
- reading said volume management information from said volume management information area specified by said application identification information.

14. The record medium as claimed in claim 11, said method steps comprising:
- reading user identification information from a location following said predetermined area; and
- stopping reading said volume management information if user identification information given by a user does not match the user identification information read from the location following said predetermined area.

15. The record medium as claimed in claim 11, said method steps comprising reading said record-medium-identification information from a last session of said record medium.

16. A record medium having data read therefrom or written therein according to volume management information complying with ISO9660 stored therein, said record medium comprising:
- a predetermined area which is a location of a logical block number 16 and stores record-medium-identification information therein instead of said volume management information, and wherein said record-medium-identification information stored in said predetermined area of said record medium indicates that data is recorded in the record medium in a different format than provided for by ISO9660; and
- a volume management information area which is different from the location of the logical block number 16, and stores said volume management information therein.

* * * * *